April 5, 1966   M. L. LONG   3,244,148
COMBINATION CONTAINER AND BIRDHOUSE
Filed May 1, 1964
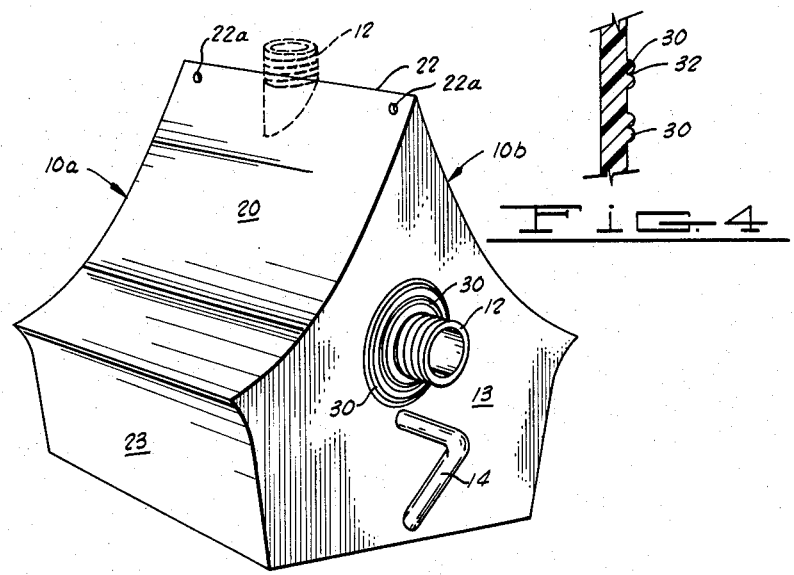
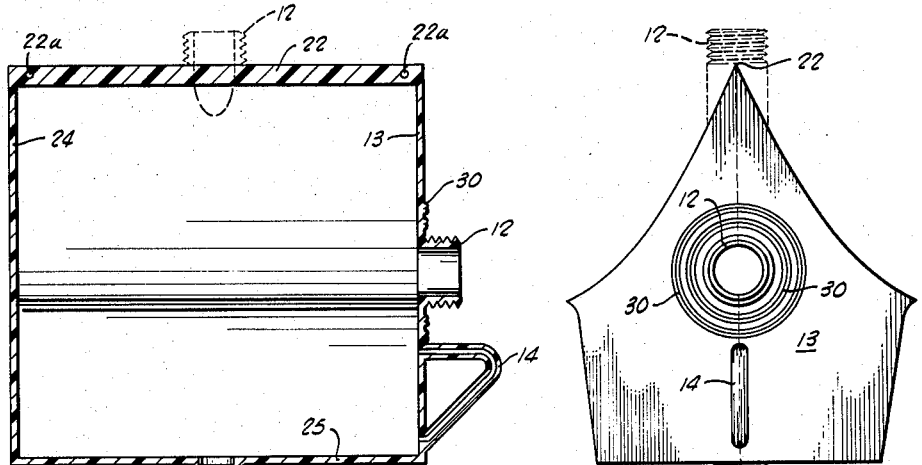
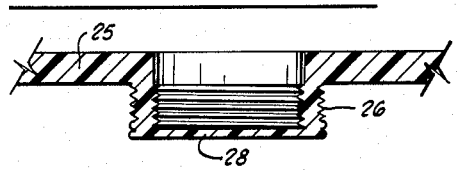
INVENTOR.
MARY L. LONG
BY
ATTORNEYS

3,244,148
COMBINATION CONTAINER AND BIRDHOUSE
Mary L. Long, 1933 NW. 56th Terrace,
Oklahoma City, Okla.
Filed May 1, 1964, Ser. No. 364,211
5 Claims. (Cl. 119—23)

This invention relates to a container, which, after disposal of its contents, may be converted to use as a house for birds. More particularly, the present invention relates to a blow molded plastic container which is formed in a way which facilitates its use as an attractive house for birds without substantial alteration of the container from the form in which it is used as a container.

It has heretofore been proposed to construct birdhouses from synthetic resins and plastic materials. A birdhouse of this type is described in Stone United States Patent 3,087,460. It has also been proposed to use food containers for the purpose of making of them a house for fowls or birds after the contents of the container have been removed therefrom. This concept is disclosed in Oliver United States Patent 3,049,093, as well as in one or two other previously issued patents.

The structures previously proposed for this dual purpose, however, have lacked aesthetic quality and have generally been so limited by the functional requirements of their use as containers that their genuine utility as a birdhouse has been severely curtailed. Thus, many types of birds require the provision of some type of perch or resting place adjacent the entrance to the house in order to enter the house, and in the absence of this structure, birds of this type will not nest in the house. Moreover, in instances where the spout or pouring nozzle of the container has been used to provide the opening to the birdhouse, the size of this opening is usually suitable only for certain sizes of birds and the house will therefore not be used by many types of birds. Another difficulty which has been encountered in previous efforts to convert a food, beverage or chemical solution container to a useful birdhouse is the difficulty of providing an adequate, yet attractive support for the house in a tree or on a vertical post. Wires wrapped around the container have been used for this purpose, as well as other equally unsightly devices which, if they do not frighten the birds away, severely detract from the aesthetic quality of the house.

The present invention relates to a novel synthetic resin structure which may be dually used at different times for the purpose of containing food, a beverage or a chemical solution, and also for providing an attractive and useful house for birds. Broadly described, the present invention comprises a synthetic resin enclosure which is formed by blow molding so as to be characterized by an opening or door which is adapted to receive a closure member and which functions dually as a spout from which the contents of the container may be discharged, and as an opening through which birds may enter the enclosure when it has been converted to use as a birdhouse. A handle which is configured to provide a member for carrying the structure when it is used as a container, and which also functions as a birdhouse perch is provided on the resin enclosure adjacent the opening.

In a preferred embodiment of the invention, a plurality of juxtapositioned annular ribs are provided around the opening into the resin enclosure and serve as guides for a knife or other cutting implement which is used when it is desired to enlarge the opening to permit the ingress and egress of birds of a larger size. A preferred embodiment of the invention also includes the provision of an annular projection formed on one side of the container (the bottom of the container when it is converted to a birdhouse), which projection may be used to secure the birdhouse to the top of a threaded pipe or tubular member driven into the ground. The projection may be molded with interior threads, or left with a smooth interior so that the threaded pipe or tubular member may cut its own threads. The configuration and construction of the container are such that a sting or wire supporting member may be passed through a thin edge of the container forming the gable or ridge of the roof, and such supporting member used to suspend the container from the limb of a tree or the like when the container is converted to use as a birdhouse.

The novel structure which constitutes the invention is made by the process of blow molding synthetic resin. By using this procedure, the hollow handle of the container can be easily formed in its location adjacent the spout or opening of the container, and the container can be formed quickly and economically in a one-shot molding process. The opening into the container which becomes the door of the birdhouse when the container is used for this purpose also serves during the blow molding process to admit air to the interior of the mold so that the molten plastic material can be expanded into the two cooperating halves of the mold.

From the foregoing description of the invention, it will have become apparent that it is a major object of the invention to provide a new type of blow molded resin container which can be easily utilized as a container for foods, beverages, or chemical solutions of various types, and which can be easily converted following such use to an attractive birdhouse.

A further object of the present invention is to provide a resin container which can be converted to an attractive birdhouse, and when used as a birdhouse, can be easily modified to accommodate birds of differing sizes.

Another object of the present invention is to provide a structure which can be dually used at different times as either a container for carrying and storing material, or as a birdhouse, which structure is relatively inexpensive to construct and is characterized by a long and trouble-free service life.

A further object of the present invention is to provide a container which can be easily converted to a birdhouse which can be suspended from the limb of a tree or mounted upon a vertical pole without difficulty and without marring the appearance of the birdhouse by an unnecessarily unattractive quantity of wire or other flexible material used to support the birdhouse in position.

Yet another object of the present invention is to provide a structure which can be used at different times, either as a container or as a birdhouse, with the spout or opening of the container serving as the entrance of the birdhouse and the handle of the container positioned adjacent such opening and functioning when the container is used as a birdhouse as a perch for birds using the birdhouse.

A further object of the present invention is to provide a container which may be more quickly and easily converted to an attractive birdhouse than has been possible with other containers which have previously been produced and which have been convertible to birdhouses.

In addition to the foregoing described objects and advantages, additional objects and advantages will become apparent as the following detailed description of the invention is read in conjunction with a perusal of the accompanying drawings which illustrate the invention.

In the drawings:

FIGURE 1 is a perspective view of the combination container-birdhouse of the present invention.

FIGURE 2 is a vertical sectional view taken through the vertical center plane of the container-birdhouse of the invention.

FIGURE 3 is a view in elevation of the container-birdhouse of the invention as it appears when viewed from the top of the container or front of the birdhouse.

FIGURE 4 is an enlarged detail sectional view of the molded portion of the container-birdhouse which permits the opening into the birdhouse to be enlarged if it is desired to make the birdhouse useful by birds of relatively large size.

FIGURE 5 is an enlarged detail sectional view of the generally cylindrical projection provided on the bottom of the container-birdhouse for the purpose of permitting the structure, when used as a birdhouse, to be mounted atop a vertically extending pole or tubular member.

Referring now to the drawings in detail, and particularly to FIGURE 1, the combination container-birdhouse of the invention may be described as consisting of two integral mirror image halves 10a and 10b which are formed by a blow molding process, with the part line of the two halves of the mold used in the molding process indicated in FIGURE 3 by the dashed line. It will be noted in referring to the drawings that the two halves 10a and 10b of the birdhouse form, when integrally joined together along the part line, an annular entrance spout 12 which projects from a front wall 13. In a preferred embodiment of the invention, the spout 12 is externally threaded to receive a suitable cap or closure member (not shown) when the structure is used as a container.

Positioned adjacent the entrance spout 12 is a generally V-shaped handle 14 which, with the front wall 13 of the structure, forms a right triangle. As will be understood by those skilled in the art of molding synthetic resins, the use of the blow molding process for forming the container-birdhouse results in the handle 14 being hollow. It will further be noted that only by a blow molding process in which the part line of the two mold halves bisects the spout 12 into the container-birdhouse, and also bisects the handle 14, can a structure resembling that shown in the drawings be made.

The combination container-birdhouse is formed in a configuration such that a pair of concave, sloping roof portions 20 are provided, which roof portions converge to a ridge at the top of the birdhouse. Due to the convergence of the two roof portions 20, a thickened ridge portion 22 is provided adjacent the top of the birdhouse through which are located apertures 22a through which may be passed the ends of a string or wire to facilitate the suspension of the birdhouse from the limb of a tree, if it is desired to support the birdhouse in this fashion.

A pair of side walls 23 and a back wall 24 extend downwardly from the roof portions 20 to a bottom wall 25. On the bottom wall 25 of the birdhouse (one side of the container when the structure is so used), a cylindrical projection 26 is provided which preferably is both externally and internally threaded by a common thread. This permits the structure, when used as a birdhouse, to be mounted atop a threaded pole or tubular member which is driven vertically into the ground. A closure plate 28 is formed across and closes the cylindrical projection 26. If the internal threads of the projection 26 are to be used for mounting the birdhouse, the closure plate 28 is cut away. If preferred, the molded threads may be omitted so that threaded pole or tubular member will cut its own threads. The cylindrical projection 25 also functions as a drain hole when the closure plate 28 is removed.

One of the most important features of a preferred embodiment of the present invention is the provision of means facilitating the enlargement of the opening into the birdhouse so that birds of differing sizes will be able to use the house. The spout 12 which is provided will preferably be constructed of a size sufficient to permit the entrance into the house only of small birds, such as wrens (⅞" in diameter). In order to facilitate the enlargement of the opening into the house, a plurality of pairs of juxtapositioned annular ribs or protuberances 30 are provided concentrically around the spout 12.

In referring to FIGURE 5, it will be noted that the annular ribs 30 define between them a groove 32. If the owner of the combination container-birdhouse desires to enlarge the opening into the birdhouse to permit larger birds to nest therein, a knife or other cutting member can be passed through the front wall 13 of the birdhouse between a pair of the ribs 30. The ribs 30 then function to guide the knife as it is moved in a circular direction in order to cut out a larger opening into the birdhouse. The ribs 30 are, of course, positioned at locations which have been predetermined to correspond to the size opening which is most suitable for birds of certain types. Generally, the provision of two pairs of the annular ribs (at diameters of 1¼ inches and 2 inches) will afford sufficient selectivity in the size of birds which the house will accommodate to permit the majority of bird species to be housed. The ribs 30 are especially useful in the case of certain types of plastic or synthetic resins, such as polyethylene, since it is most difficult to cut materials of this type along a circular line without having some retaining or guiding means to prevent the knife edge from "running" or going astray during the cutting process. The same type of guide ribs can be used at the lower end of the cylindrical projection 26 to facilitate removal of the closure plate 28.

As an alternative construction, the spout 12 can be formed at the top of the birdhouse and will project upwardly therefrom to resemble a chimney. The opening in the front of the birdhouse is then cut out in the manner described to provide an entrance for the birds. This alternative position of the spout 12 is shown in dashed lines in FIGURE 1.

From the foregoing description of the invention, it is believed that it will be apparent that the dual container-birdhouse structure provided by the present invention can be easily used as a container and then converted without difficulty to an attractive and easily located birdhouse. The blow molding technique used for forming the birdhouse is especially well-adapted to the provision of an opening which can serve the dual function of a spout for the container and an entrance for birds, and also to the provision of a handle adjacent such spout which can function, when the container is converted to a birdhouse, as a perch to permit birds to land prior to entering the birdhouse. The construction of the container and its novel configuration further facilitates the mounting of the birdhouse, either upon a vertical member placed in the ground or the suspension of the birdhouse upon a wire or string from a limb, without the necessity to unattractively wrap the wire around the birdhouse or to experience any difficulty in securing the wire or supporting member to the house. As an alternative method of mounting, the house may be nailed to a flat surface by driving nails downwardly at an angle through the lower edges of the side walls 23 and the bottom 25.

Although certain preferred embodiments of the invention have been hereinbefore described by way of example, it may be foreseen that several changes in the configuration and structure of the invention may be indulged without departing from the basic principles which underlie the invention and which provide several of the most important and useful aspects thereof. Insofar, therefore, as modifications and innovations in the described structure continue to be based upon, and to utilize, the basic concepts and principles underlying the invention, such modifications and innovations are deemed to be circumscribed by the spirit and scope of the invention except as the same may be necessarily limited by the appended claims or reasonable equivalents thereof.

What is claimed is:

1. A combination container-birdhouse structure comprising:
   a roof portion;
   a bottom wall opposite said roof portion;
   a front wall, rear wall and two side walls interconnecting said roof portion and said bottom wall;

a protruding member on the front wall functioning as a dual container handle and perch for birds; and a spout opening into said container-birdhouse structure and projecting from said front wall at a point adjacent said protruding member, said spout being cylindrical, externally threaded and ⅞ inch in diameter to permit small birds, such as wrens and the like, to enter said structure through said spout;

and further characterized to include:

a first pair of concentric, juxtapositioned annular ribs on said front wall concentrically surrounding said spout and forming means for guiding a cutting implement used to enlarge the opening into said container-birdhouse, said annular ribs defining between them an annular cutting line having a diameter of 1¼ inches to accommodate a second group of birds larger than wrens; and a second pair of concentric, juxtapositioned annular ribs on said front wall concentrically surrounding said spout and said first concentric, juxtapositioned annular ribs and forming means for guiding a cutting implement used to enlarge the opening into said container-birdhouse to accommodate a third group of birds larger than said second group of birds.

2. A combination container-birdhouse structure comprising:

a roof portion;
a bottom wall opposite said roof portion;
a front wall, rear wall and two side walls interconnecting said roof portion and said bottom wall;
an entrance spout on said front wall;
a generally cylindrical spout extending upwardly from said roof portion and functioning dually as a pouring spout and a simulated chimney;
a protruding member on the front wall functioning as a dual container handle and perch for birds; and
at least one pair of concentric, juxtapositioned annular ribs on said front wall forming means for guiding a cutting implement to provide an opening into said structure.

3. A combination container-birdhouse structure comprising:

a roof portion;
a bottom wall opposite said roof portion;
a flat front wall, rear wall and two side walls interconnecting said roof portion and said bottom wall and forming with said roof portion and bottom wall, an enclosure;
a protruding member on the front wall functioning as a dual container handle and perch for birds;
an entrance spout opening into said container-birdhouse structure and projecting from said wall at a point adjacent said protruding member, said spout being cylindrical and dimensioned to permit relatively small birds, such as wrens and the like, to enter said structure through said spout;

a pair of concentric, juxtapositioned annular ribs on said flat wall concentrically surrounding said entrance spout and lying entirely within the plane of said flat front wall, said ribs forming means for guiding a cutting implement used to enlarge the opening to said container-birdhouse to accommodate a group of birds of larger size than wrens.

4. A combination container-birdhouse structure comprising:

a roof portion;
a bottom wall opposite said roof portion;
a flat front wall, rear wall and two side walls interconnecting said roof portion and said bottom wall, and forming therewith a closed container;
a protruding member on the flat front wall functioning as a dual container, handle and perch for birds;
an entrance spout opening into said container-birdhouse structure and projecting from said front wall at a point adjacent said protruding member;
a tubular generally cylindrical projection extending outwardly from a hole in said bottom wall and being externally circumferentially threaded for mounting said structure on a pole for use as a birdhouse; and
a closure plate closing the outer end of said generally cylindrical projection whereby when said closure plate is removed, said cylindrical projection can be utilized as a mounting structure for said birdhouse and as a drain hole for said container-birdhouse.

5. A container-birdhouse as claimed in claim 3 wherein said roof portion comprises two concavely curved surfaces converging at one of their edges to form the ridge of said roof and having their other edges extending past said side walls to form eaves, and wherein said side walls slope downwardly and inwardly from said concavely curved roof surfaces, and converge toward each other as they approach the bottom wall of said container-birdhouse.

References Cited by the Examiner

UNITED STATES PATENTS

| D. 170,833 | 11/1953 | Rebora | 119—23 X |
|---|---|---|---|
| 388,385 | 8/1888 | Wooster | 119—23 |
| 1,169,409 | 1/1916 | Larson | 119—23 |
| 1,185,345 | 5/1916 | Reiber | 119—23 |
| 2,837,245 | 6/1958 | Grebowiec | 215—1 X |
| 2,887,987 | 5/1959 | Fitzgerald et al. | 119—23 |
| 2,920,777 | 1/1960 | Cole | 215—1 |
| 3,066,819 | 12/1962 | Cox | 220—94 |
| 3,078,826 | 2/1963 | Bear | 119—23 |
| 3,100,576 | 8/1963 | Frank | 215—100 |

FOREIGN PATENTS 1,013,112  8/1957  Germany.

SAMUEL KOREN, *Primary Examiner.*

ALDRICH F. MEDBERY, *Examiner.*